(12) United States Patent
Mayeur et al.

(10) Patent No.: US 9,556,387 B2
(45) Date of Patent: Jan. 31, 2017

(54) PROCESS FOR THE HYDROTREATMENT OF A GAS-OIL FEEDSTOCK, REACTOR FOR IMPLEMENTING SAID PROCESS, AND CORRESPONDING HYDROREFINING UNIT

(75) Inventors: Vincent Mayeur, Notre Dame de Gravenchon (FR); Cesar Vergel, Maneglise (FR); Laurent Mariette, Deauville (FR)

(73) Assignee: TOTAL RAFFINAGE FRANCE, Courbevoie (FR)

( * ) Notice: Subject to any disclaimer, the term of this patent is extended or adjusted under 35 U.S.C. 154(b) by 1074 days.

(21) Appl. No.: 12/373,158

(22) PCT Filed: Jul. 18, 2007

(86) PCT No.: PCT/FR2007/001234
§ 371 (c)(1),
(2), (4) Date: Jan. 9, 2009

(87) PCT Pub. No.: WO2008/012415
PCT Pub. Date: Jan. 31, 2008

(65) Prior Publication Data
US 2009/0288988 A1    Nov. 26, 2009

(30) Foreign Application Priority Data

Jul. 27, 2006    (FR) ...................... 06 06892

(51) Int. Cl.
| C10G 49/04 | (2006.01) |
| C10G 65/04 | (2006.01) |
| C10G 65/12 | (2006.01) |
| C10G 45/04 | (2006.01) |
| C10G 45/02 | (2006.01) |
| C10G 3/00  | (2006.01) |

(52) U.S. Cl.
CPC ............. *C10G 45/04* (2013.01); *C10G 3/46* (2013.01); *C10G 3/47* (2013.01); *C10G 3/50* (2013.01); *C10G 3/54* (2013.01); *C10G 3/60* (2013.01); *C10G 45/02* (2013.01); *C10G 2300/1014* (2013.01); *C10G 2300/1018* (2013.01); *C10G 2300/1074* (2013.01); *C10G 2300/4081* (2013.01); *C10G 2400/06* (2013.01); *Y02P 30/20* (2015.11)

(58) Field of Classification Search
CPC ......... C10G 49/04; C10G 65/04; C10G 65/12; B01J 2219/00006
See application file for complete search history.

(56) References Cited

U.S. PATENT DOCUMENTS

| 2,917,532 | A |   | 12/1959 | Watkins |
| 3,926,591 | A | * | 12/1975 | Wildmoser et al. ............ 95/180 |
| 4,992,605 | A | * | 2/1991  | Craig et al. ................... 585/240 |
| 5,268,104 | A | * | 12/1993 | Masoomain ................. 210/638 |
| 5,316,658 | A | * | 5/1994  | Ushio .................... C10G 65/04 208/15 |
| 5,705,722 | A |   | 1/1998  | Monnier et al. |
| 6,270,655 | B1|   | 8/2001  | Ganguli |
| 2006/0060509 | A1 | * | 3/2006 | Miyauchi et al. ............ 208/210 |

FOREIGN PATENT DOCUMENTS

| EP | 1 693 432 A1 | 8/2006 |
| FR | 2 879 213 A1 | 6/2006 |

* cited by examiner

*Primary Examiner* — Randy Boyer
(74) *Attorney, Agent, or Firm* — Sughrue Mion, PLLC (57) ABSTRACT

The invention relates to a process for the catalytic hydrotreating of a feed of oil origin, of diesel fuel type, in at least one fixed-bed hydrotreating reactor, for manufacturing diesel fuel, characterized in that incorporated into said feed are vegetable oils and/or animal fats up to a level of around 30% by weight, the mixture of said feed and vegetable oils and/or animal fats being introduced into the reactor operating in a single pass, without recycling liquid effluent at the top of the reactor.

It also relates to a hydrotreating reactor for implementing said process, and to a corresponding hydrorefining unit.

16 Claims, 2 Drawing Sheets

PROCESS FOR THE HYDROTREATMENT OF A GAS-OIL FEEDSTOCK, REACTOR FOR IMPLEMENTING SAID PROCESS, AND CORRESPONDING HYDROREFINING UNIT

The invention relates to a process for hydrotreating a diesel fuel feed, a hydrotreating reactor for implementing said process, and a corresponding hydrorefining unit.

Due to the tightening of pollution control standards for diesel engines, the specifications for diesel engine fuels have changed during the course of the last two decades and new constraints have appeared which have led to a modification of the formulations of diesel engine fuel mixtures.

Since January 2005, the specifications for diesel engine fuels have been the following (French standard EN590):
  Density (at 15° C.): 820-845 kg/m$^3$
  T95% (distillation temperature for 95% of diesel fuel): 360° C. (maximum)
  Sulphur content: 50 mg/kg (maximum)
  Engine cetane index: 51 (minimum)
  Calculated cetane index (ASTM D4737): 46 (minimum)
  Cloud point: <−5° C. in winter,
  <+5° C. in summer.

The desired base stocks are therefore light base stocks, without sulphur, having a high cetane index, and that distil completely below 360° C.

The objectives are to further reduce the sulphur content to a value below 10 mg/kg by 2009 and to increase the minimum value of the engine cetane index.

One solution for improving the cetane index consists in adding a pro-cetane additive. These are most often alkyl nitrates which intervene in the elementary oxidation steps before the self-ignition of the mixture. Thus they reduce the ignition delay and make it possible to increase the cetane index by 3 to 5 points depending on the amount added. They are however, much less effective when the starting cetane index is low.

Another solution consists in adding to the mixture, a substitution fuel, such as a biofuel, as the esters of vegetable oils generally have a good cetane index.

Therefore, the European Directive 2003/30/EC aims especially to promote the use of biofuels. In the transport industry, the European Community has adopted an objective of substituting biofuels for 5.75% of the NCV (net calorific value) of fuels by 2010. That is to say that the amount of biofuel present in the mixture should provide 5.75% of the NCV of the mixture.

Currently, the French government has established a tax: the TGAP (Taxe Générale des Activités Polluantes [General Tax on Polluting Activities]), which relates to fuels consumed on French territory. The fuels subject to this tax are "SP95", "SP98" and "diesel engine fuel". The objective of this tax is to encourage the incorporation of biofuel of agricultural origin by gradually increasing the % NCV (net calorific value) from 1.75% in 2006 to 7.00% in 2010.

This addition is carried out based on the energy and "Bio" origin of the products incorporated. Thus, ETBE (ethyl tert-butyl ether) sees its level reduced as it only contains 47% of ethanol (of agricultural origin) and an NCV lower than petrol.

For diesel engine fuels, the most commonly used biofuels are vegetable oil esters, such as the methyl ester of rapeseed oil (MER).

These diesel engine fuels are generally obtained by mixing the biofuel to the diesel engine fuel after treating the latter. These mixtures are thus often carried out by the distributors, just before distributing the fuel.

The mixtures obtained from methyl esters of vegetable oils have the advantage of a cetane index that conforms to the standard, but their density is much higher than the specification of the standard (greater than 800 kg/m$^3$), which causes formulation difficulties at high incorporation levels. The ethyl esters of vegetable oils also result in mixtures that are too heavy.

Processes for refining biomass which have been designed to produce these biofuels are already known. Thus, the documents U.S. Pat. No. 4,992,605, U.S. Pat. No. 5,705,722 and SE 520 633 describe processes for hydrotreating triglycerides that form vegetable oils. The reactions carried out are however strongly exothermic. In order to limit the problems linked to this high exothermicity, it is necessary to recirculate up to 80% of the feed from the hydrotreating reactor outlet to its inlet, hence the need to produce a new plant dedicated to this hydrotreating process, and to oversize this unit relative to the amount of feed actually treated.

The Applicant has developed a hydrotreating process that makes it possible to incorporate a maximum of biomass in a diesel fuel feed without substantial modification of the conventional hydrotreating unit and, in particular, without a device for recycling the liquid effluent at the top of the reactor, while still obtaining a finished product of superior quality (density, cetane index, cloud point, stability).

For this purpose, the invention relates to a process for the catalytic hydrotreating of a feed of oil origin, of diesel fuel type, in at least one fixed-bed hydrotreating reactor, for manufacturing diesel fuel, characterized in that incorporated into said feed are vegetable oils and/or animal fats up to a level of around 30% by weight, the mixture of said feed and vegetable oils and/or animal fats being introduced into the reactor operating in a single pass, without recycling liquid effluent at the top of the reactor.

The catalytic hydrotreating process that is the subject of the present invention is capable of operating under particularly advantageous conditions when said feed to be treated is introduced into the reactor with a level of vegetable oils and/or of animal fats of 2.5 to 25% by weight.

This is because, according to the invention, it is not necessary to carry out major modifications to the oil units for hydrotreating diesel fuels when relatively low amounts of biomass (for example at incorporation levels of less than 10%) are incorporated into these diesel fuels, as the high exothermicity of hydrotreating the triglycerides of the biomass is controlled by the presence of the diesel fuel feed.

However, as soon as the incorporation level of biomass in the feed to be hydrotreated passes above such a value, it is still possible to use a conventional hydrotreating unit without major modification, and especially without recycling the liquid effluent at the top of the reactor, by adapting the conditions in a manner known per se.

According to particular features of the invention:
  the feed of oil origin, of diesel fuel type, is chosen from the diesel fuel type cuts resulting from the direct (or straight-run (SR)) distillation of a crude oil, the diesel fuel type cuts derived from various conversion processes, and in particular those derived from catalytic cracking and from visbreaking;
  the vegetable oils are chosen from palm oil, soya bean oil, rapeseed oil, sunflower oil, preferably palm oil, or a mixture of two or more of these oils;
  an amount of hydrogen introduced into the reactor to treat the feed of 100 to 500 Normal liters of H$_2$ per liter of feed, preferably of 120 to 450 Normal liters of H$_2$ per liter of feed, is used;

the feed is treated at a temperature of 320 to 420° C., preferably of 340 to 400° C., and even more preferably of 350 to 370° C.;

the feed is treated at a pressure of 25 to 150 bar, preferably of 30 to 70 bar; and the feed is treated over at least one catalyst bed in the reactor, the catalyst bed containing at least one catalyst based on metal oxides, chosen from the oxides of NiMo, CoMo, NiW, PtPd, or a mixture of two or more of them.

Advantageously, especially when the level of vegetable oils and/or animal fats is high, the feed is treated over at least one catalyst bed containing, at least in part, one catalyst based on nickel oxides.

The catalyst beds containing NiW oxides has especially the advantage of catalyzing the isomerization reactions, which may make it possible to improve, that is to say to reduce, the cloud point of the finished product. In particular, in the case of a diesel fuel feed comprising a high cloud point, a catalyst bed containing NiW, and preferably NiW oxides on amorphous silica-alumina, by promoting the isomerization reactions, will enable the cloud point of the finished product to be very significantly reduced.

The catalyst beds containing NiMo oxide type catalysts have a strong hydrogenating and hydrodeoxygenating power for triglycerides.

It is also possible to envisage, in a particularly advantageous manner, treating the feed by means of several successive beds of catalysts with, for example, a first bed containing NiMo oxides to improve the hydrogenation of the triglycerides of the feed and/or NiW oxides to catalyse the isomerization reactions, and the following catalyst bed or beds containing catalysts based on CoMo which have a good hydrodesulfurization performance at a low hydrogen pressure (the hydrogen having been partly consumed by the hydrogenation in the presence of the NiMo-based catalyst).

The proportions of the various catalysts will be determined depending on the reactions that it is desired to promote.

In a conventional hydrotreating unit, gases which will be reinjected into the reactor after passing into a treatment system are separated from the effluent exiting the reactor. These gases, called recycling gases, mainly contain hydrogen.

When the level of vegetable oils and/or animal fats is high, hydrotreating a diesel fuel feed mixed with these vegetable oils and/or animal fats results in the formation of carbon monoxide CO which will be found in this recycling gas.

In one particularly advantageous variant of the process comprising treatment of a recycling gas derived from the hydrotreating of the feed before its reinjection into the reactor, an additional treatment is carried out during which the carbon monoxide present in said recycling gas is treated and is separated from said recycling gas before its reinjection into the reactor.

It is also possible not to reinject the carbon monoxide into the reactor and not to risk inhibiting the catalyst.

The treatment and separation of the carbon monoxide may be carried out by introducing, into the system for treating the recycling gases, a device for treating and separating the carbon monoxide. In particular, it is possible to use CO conversion equipment (known as "CO shifts" by experts) such as those generally supplied by hydrogen unit manufacturers.

Such a treatment of CO may be implemented when the CO content of the recycling gases reaches a predetermined value.

Advantageously, in addition, a treatment is carried out during which the carbon dioxide present in said recycling gas is treated and is separated from said recycling gas before its reinjection into the reactor. This treatment is for example carried out by passing the recycling gas into an amine absorber.

Another particularly advantageous way of using the invention, and this too being as soon as the level of vegetable oils and/or animal fats is high, is to compensate for the exothermicity that necessarily results from the addition of these oils.

Thus, advantageously, the exothermicity of the hydrotreating of the feed is controlled by means of thermal control systems.

In a conventional hydrotreating unit, this is for example improving the liquid/gas distribution, gas quenching or liquid effluent quenching (that is to say the supply of cold gases or liquids to the reactor), distribution of the catalyst volume over several catalyst beds, control of preheating of the feed at the reactor inlet, especially by action on the oven and/or the heat exchangers located upstream of the reactor, or on by-pass lines, etc., to reduce the temperature at the reactor inlet.

The invention also relates to a reactor for catalytic hydrotreating of a feed of oil origin, of diesel fuel type, for implementing the process according to the invention, characterized in that it comprises at least one catalyst bed containing at least one catalyst based on metal oxides, chosen from the oxides of NiMo, CoMo, NiW, PtPd, or a mixture of two or more of them.

Advantageously, the reactor comprises at least one catalyst bed containing a catalyst based on nickel oxide.

The invention also relates to a hydrorefining unit comprising at least one reactor for the catalytic hydrotreating of a feed of oil origin, of diesel fuel type, according to the invention.

It also relates to a hydrorefining unit comprising at least one reactor for the catalytic hydrotreating of a feed of oil origin, of diesel fuel type, and a separator that separates the liquid and vapour phases of the effluent exiting the reactor, characterized in that it comprises, downstream of the separator, a unit for treating and separating carbon monoxide present in the vapour phase of the effluent for implementing the process according to the invention.

Advantageously, the unit comprises, downstream of the separator, a unit for treating and separating the carbon dioxide present in the vapour phase of the effluent for implementing the process according to the invention.

The vegetable or animal oils used according to the invention are mainly composed of fatty acid triglycerides (>90% by weight), the chain lengths depending on the nature of the oil used.

The vegetable oils may, in particular, be palm oil, soya bean oil, rapeseed oil, sunflower oil, or a mixture of two or more of these oils. These oils will mainly produce $C_{15}$ to $C_{18}$ paraffins.

Palm oil is therefore particularly preferred, as it is one of the oils comprising the shortest carbon chains, with close to 50% of $C_{16}$. As palm oil is one of the most saturated oils, its hydrotreatment requires a lower amount of hydrogen relative to the other oils. In addition, the thermal stability of palm oil limits clogging of the heat exchangers located upstream of the reactor in a conventional hydrorefining unit.

Palm oil has, in addition, the advantage of having its profile centred on that of the diesel fuel feed, which limits the disturbance of the latter, of being economical, and of being little used for human consumption.

As animal fats, it is possible, for example, to use fish fat.

A particularly advantageous way of using the invention is therefore to preferably use palm oil or any other vegetable oil or oil of animal origin capable of producing, by hydrotreatment, a maximum of $C_{15}$ to $C_{18}$, preferably $C_{15}$ or $C_{16}$, paraffins so as to significantly increase the cetane index of the feeds produced while still reducing the density as much as possible, and of further enhancing the base stocks having a low cetane index and a high density, such as LCO ("Light Cycle Oil") which is characterized by a high density and a very low cetane index, and the diesel fuels resulting from acid crudes that have excellent low-temperature properties but have the characteristics of having a high density and a low cetane index.

Figure 1:
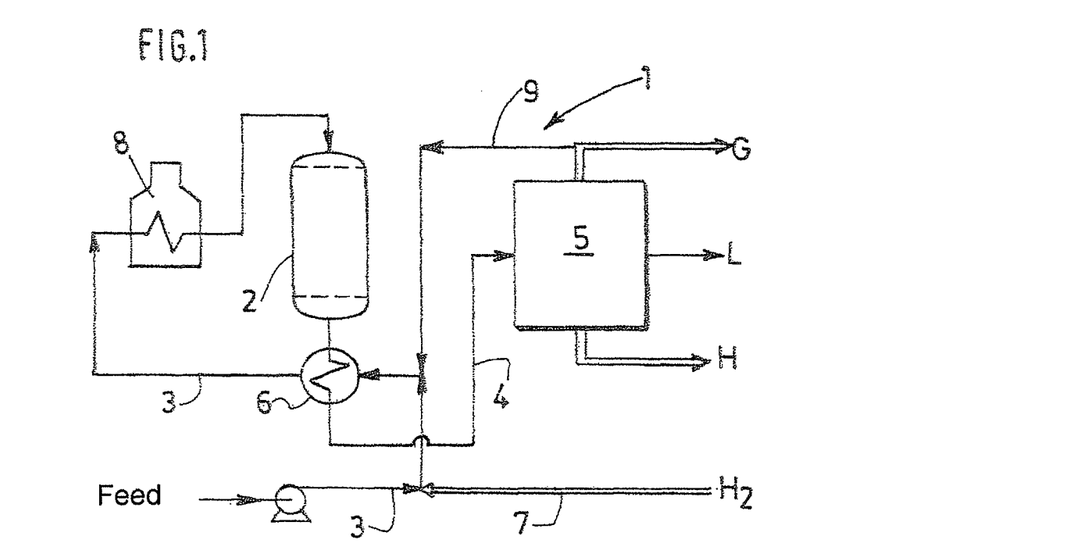
FIG. 1 is a simplified diagram of a conventional unit 1 for hydrotreating a feed of diesel fuel type.

The invention will now be described with reference to the appended, non-limiting, drawings, in which:

FIG. 1 represents a simplified diagram of a conventional unit 1 for hydrotreating a feed of diesel fuel type.

This unit 1 comprises a reactor 2 into which the charge to be treated is introduced by means of a line 3. This reactor contains one or more hydrorefining catalyst beds.

A line 4 recovers the effluent at the outlet of the reactor 2 and conveys it to a separation stage 5.

A heat exchanger 6 is placed downstream of the reactor in the line 4 in order to heat the feed flowing in the line 3, upstream of the reactor.

Upstream of this heat exchanger 6, a line 7, connected to the line 3, provides the feed to be treated with a gas rich in $H_2$.

Downstream of the heat exchanger 6, and upstream of the reactor 2, the feed mixed with the gas rich in $H_2$ flowing in the line 3 is heated by an oven 8.

Thus, the feed is mixed with the gas rich in hydrogen, then brought to the reaction temperature by the heat exchanger 6 and the oven 8 before entering into the reactor 2. It then passes into the reactor 2, in the vapour state if it is a light cut, or as a liquid-vapour mixture if it is a heavy cut.

At the outlet of the reactor, the mixture obtained is cooled, then separated in the separation stage 5, which makes it possible to obtain:

an acid gas G rich in $H_2S$, some of which is reinjected into the gas rich in $H_2$ mixed with the feed, by means of a line 9;

light products L that result from the decomposition of the impurities. The removal of sulphur, nitrogen, etc., results especially in a destruction of many molecules and in the production of lighter fractions; and a hydrorefined product H having the same volatility as the feed but having improved characteristics.

Conventionally, the effluent exiting the reactor 2 is cooled and partially condensed, then enters into the separation stage 5.

Figure 2:
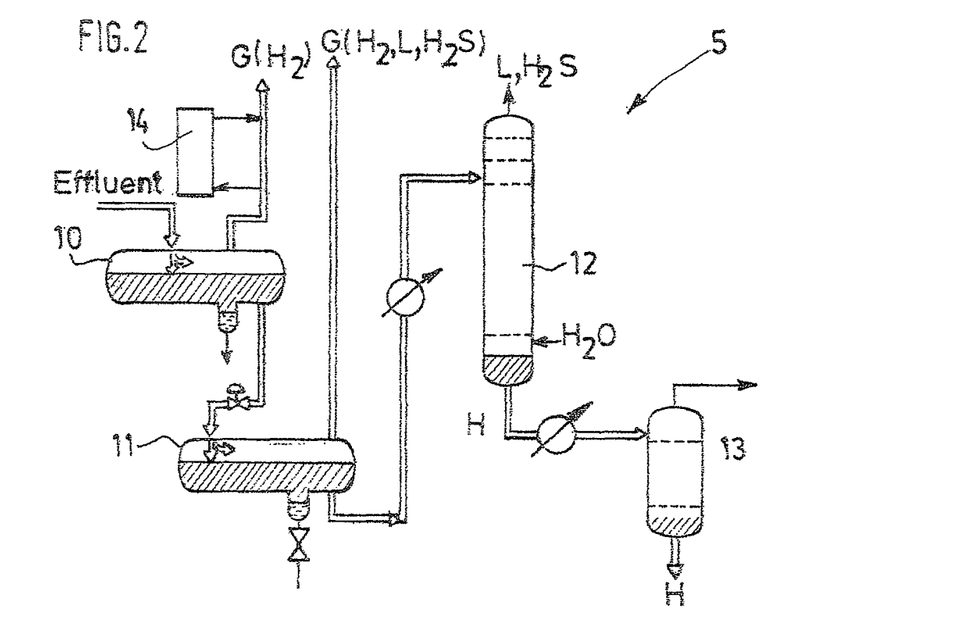
FIG. 2 is a simplified diagram of a separation stage of a conventional hydrotreating unit.

Such a separation stage 5 generally comprises (FIG. 2):

a first high-pressure (around 55 bar) separator tank 10 which makes it possible to separate a hydrogen-rich gas $G(H_2)$ from the effluent, this gas possibly being recycled;

a second low-pressure (10 bar) separator tank 11 which separates the liquid and vapour phases obtained by pressure drop of the liquid coming from the high-pressure tank 10. The gas $G(H_2, L, H_2S)$ obtained mainly contains hydrogen, light hydrocarbons and a large part of the hydrogen sulphide that is formed in the reactor;

a steam stripper 12 whose role is to remove the light hydrocarbons L and the residual $H_2S$ of the treated feed. The hydrorefined product H is decanted from the bottom of this stripper; and a vacuum drier 13 that makes it possible to remove the water dissolved by the hot hydrorefined product in the stripper.

According to the invention, in a reactor that makes up part of a hydrotreating unit, such as the hydrodesulphurization unit of the type described above, a mixture of a diesel fuel type feed and up to 30% by weight, preferably 2.5 to 25% by weight of vegetable oils and/or animal fats is introduced as a feed.

The hydrogen feed ratio, that is to say the amount of hydrogen mixed with the feed is from 100 to 500 Nl/l, preferably from 120 to 450 Nl/l.

The temperature of the average reaction feed is from 320° C. to 420° C., preferably from 340° C. to 400° C., and more preferably from 350° C. to 370° C.

The pressure inside the reactor is from 20 to 150 bar, preferably from 30 to 70 bar.

Preferably, one catalytic hydrotreating unit according to the invention also comprises a unit 14 for treating and separating the carbon monoxide produced in the reactor and separated in the effluent separation stage 5.

Preferably, this treatment and separation unit is a conversion unit that converts the CO into another compound that can be easily removed, such as for example carbon dioxide.

It is, for example, a unit for the conversion of carbon monoxide to carbon dioxide according to the reaction:

$$CO+H_2O \rightarrow CO_2+H_2$$

The resulting carbon dioxide may then be easily removed, for example by scrubbing with amines, while the hydrogen produced may be recovered in order to reinject it into the reactor or mix it with the hydrogen-rich gas mixed with the feed.

Such a unit 14 for conversion of CO, known per se, is placed so as to treat the gaseous phase separated by the separation stage 5.

In one separation stage 5 comprising high-pressure (10) and low-pressure (11) separator tanks as shown in FIG. 2, this unit 14 will therefore be preferably placed at the outlet of the gas separated by the high-pressure separator (11).

The temperature at the outlet of this tank is around 40° C., and depending on the nature of the catalyst used, the conversion temperature of CO may reach 350° C. It may then be necessary to heat the gas to be treated entering into this conversion unit.

Preferably, a catalyst will be chosen that does not require the gas to be heated.

The unit 14 for conversion of CO will preferably be placed in a by-pass line, so that the conversion of CO is only carried out when the CO content of the gas exceeds a predetermined threshold.

Depending on the amounts of CO, the following will, for example, be used:
- a low-temperature conversion unit (normally known as an LT Shift), operating at a temperature of 190-220° C., for a CO content below 5000 ppm by volume,
- a medium-temperature conversion unit (normally known as an MT Shift), operating at a temperature of 220-270° C., for a CO content of 10 000 to 20 000 ppm by volume, and
- a high-temperature conversion unit (normally known as an HT Shift), operating at a temperature of 320-350° C. for a CO content greater than 3% by volume.

This conversion unit 14 may be coupled to a unit for treating and separating $CO_2$, not shown, and known per se.

EXAMPLES

Three feeds based on diesel fuel and vegetable oils were treated in a pilot hydrodesulphurization unit (Examples 1 to 4).

The diesel fuel feed was treated without incorporation of vegetable oils in Example 1, which was used as a reference, and with 5%, then 10% and 20% by weight of palm oil in Examples 2, 3, and 4 respectively.

Two other feeds based on diesel fuel were treated in Examples 6 and 7 with 30% and 50% of vegetable oils respectively, in order to illustrate the determination, by calculation, of a maximum limit for incorporation of vegetable oils presented in Example 5.

The experimental conditions are detailed below.

Examples 1 to 4

Installation

The process according to the invention was tested on a pilot unit comprising a reactor operating in ascending flow mode of the liquid and gas streams:
- this reactor had a diameter of a few centimeters;
- a heater placed upstream of the reactor made it possible to heat the feed to be treated before it entered into the reactor;
- the pilot unit had no gas recycling and the feed was treated in a single pass, that is to say in "once through" according to the experts;
- the purity of the hydrogen injected into the pilot unit was 100%. The temperature profile of the reactor was constant, the reactor operating in isothermal mode;
- a nitrogen-stripping stage was present at the reactor outlet in order to remove the $H_2S$, $NH_3$ and $H_2O$ gases, in case these compounds would be present in the effluent;
- the reactor comprised seven catalyst beds containing a catalyst formed from porous alumina on which nickel and molybdenum oxides were deposited. This catalyst was present in the form of 1 to 2 mm diameter extrudates of quadrilobal shape; and
- the packing density was 950 kg/m³ of packed catalyst in the unit.

Feed Studied

A diesel fuel feed having a low sulphur content was used in the examples, the palm oil being of food grade.

The characteristics of the diesel fuel feed and of the palm oil are given in Tables 1 and 2 respectively.

TABLE 1

| characteristics of the diesel fuel feed | |
|---|---|
| Density at 15° C. | 0.8433 |
| Sulphur content (ppm) | 1260 |
| Basic nitrogen content (ppm) | 20 |
| Cloud point (° C.) | −4 |
| Pour point (° C.) | −6 |
| Measured cetane index | 56 |
| Distillation temperature of | |
| 5% | 245.1 |
| 20% | 260.3 |
| 50% | 284.9 |
| 80% | 314.3 |
| 95% | 347.6 |
| of the diesel fuel (° C., ASTM 86) | |
| Bromine index (mg Br/100 g) | 621 |
| Polyaromatics content (wt %) | 8.2 |
| Total aromatics content (wt %) | 22.2 |

TABLE 2

| characteristics of the palm oil | | |
|---|---|---|
| Density at 15° C. (calculated) | | 0.8956 |
| Acid composition (percentages by weight) | | |
| Lauric acid | 12:0 | 0.2 |
| Myristic acid | 14:0 | 1.1 |
| Palmitic acid | 16:0 | 45.7 |
| Palmitoleic acid | 16:1 | 0.2 |
| Margaric acid | 17:0 | 0.1 |
| | 17:1 | <0.1 |
| Stearic acid | 18:0 | 4.3 |
| Oleic acid | 18:1 | 37.7 |
| Linoleic acid | 18:2 | 9.8 |
| Linolenic acid | 18:3 | 0.2 |
| Arachidic acid | 20:0 | 0.4 |
| Gondoic acid | 20:1 | 0.1 |
| GPC: | | |
| Free fatty acids | | 0.7 |
| Monoglycerides | | <0.1 |
| Diglycerides | | 7.1 |
| Triglycerides | | 92.0 |
| Not identified | | 0.2 |
| Element content (ppm) | | |
| Phosphorous | | 0.5 |
| Calcium | | <0.2 |
| Copper | | <0.08 |
| Iron | | 0.04 |
| Magnesium | | <0.02 |
| Sodium | | <0.1 |

Table 3 indicates the density and the sulphur content of the feeds from Examples 1 to 4. The feed density increases with the proportion of vegetable oil incorporated.

TABLE 3

| Sulphur content and density of the feeds from Examples 1 to 4 | | | |
|---|---|---|---|
| | Density at 15° C. | Sulphur content (ppm) | GPC (triglycerides) (wt %) |
| Example 1: | 0.8433 | 1260 | 0 |
| Example 2: | 0.8458 | 1190 | 5.0 |
| Example 3: | 0.8499 | 1090 | 10.0 |
| Example 4: | 0.8567 | 1040 | 20.0 |

H₂ Feed Ratio

Two hydrogen $H_2$ feed ratio (that is to say the amount of Normal liters of hydrogen per liter of feed) were studied: 130 and 225 Nl/l.

It is useful to set the hydrogen feed ratio at 3 times the hydrogen consumption of the feed treated at the reactor inlet.

The hydrogen feed ratio of 225 Nl/l, was slightly greater than three times the hydrogen consumption of the feed treated at the reactor inlet with an addition of 10% by weight of palm oil.

The hydrogen feed ratio of 130 Nl/l corresponded to 3 times the hydrogen consumption of a diesel fuel feed without palm oil.

Operating Conditions

The operating conditions of the reactor were based on a reference point determined previously on the reference diesel fuel feed.

The pressure was 40 bar and the average treatment temperature was 340° C. This temperature made it possible to ensure a sulphur content below 10 ppm starting from the reference diesel fuel treated here.

In order not to have thermal cracking of the triglyceride molecules upstream of the reactor, the preheater temperature was held at a lower temperature than the usage temperature: 320° C. It was the first catalyst bed that provided the rest of the heating for the feed.

Table 4 (operating conditions of the pilot unit) summarizes the operating conditions of the pilot unit used:

TABLE 4

| Operating conditions | |
|---|---|
| Total pressure (bar) | 40 |
| H₂/HC (Nl/l) | 130 and 225 |
| HSV (h⁻¹) | 1.0 |

TABLE 4-continued

| Operating conditions | |
|---|---|
| Preheater temperature (° C.) | 320 |
| Reactor temperature (° C.) | 340-350 |

During the feed change, the operating conditions were kept constant. The possible variation in the sulphur content due to the supply of oil and/or to the drop in the hydrogen feed ratio was measured.

In addition, the complete conversion of the triglycerides was confirmed by GC (gas chromatography). Subsequently, the temperature of the reactor may be adjusted to return to the initial sulphur content (<10 ppm).

Quality of the Products

The incorporation of vegetable oil as a feed for a hydrodesulphurization unit had the result of adding normal paraffins into the final product.

Table 5 gives the results of a detailed analysis of the effluents obtained for the first 3 examples and a partial analysis for Example 4.

Table 5 shows that:
- the low-temperature properties of the products obtained are relatively stable. Indeed, the cloud point increases by less than 1° C. at 10 wt % incorporation of palm oil and an FLT (Filterability Limit Temperature) of around 2° C.;
- the engine cetane index, itself, increases significantly: +2.2 for the engine cetane index and +2.8 for the calculated cetane index at 10 wt % of palm oil. This increase is very advantageous for diesel fuels requiring the pro-cetane additive to meet the specification; and
- the triglyceride reaction products all distil below 360° C., the T95 criterion (temperature at which 95% of the product has distilled) changes favourably for this specification: −3.4° C. at 5 wt % of vegetable oil.

Thus, the characteristics of the products obtained are favourably affected by the incorporation of vegetable oils as a feed for a hydrosulphurization unit.

TABLE 5 characteristics of the effluents from Examples 1 to 4

| | Example | | | | | | |
|---|---|---|---|---|---|---|---|
| | 1 | 2 | | 3 | | 4 | |
| H₂/HC feed ratio (Nl/l) | 225 | 225 | 130 | 225 | 130 | 225 | 130 |
| Reactor temperature (° C.) | 340 | 340 | 340 | 340 | 340 | 340 | 340 |
| Density at 15° C. | 0.8382 | 0.8346 | 0.8352 | 0.8321 | 0.833 | 0.827 | 0.828 |
| Sulphur (ppm) | 15.2 | 8.6 | 15.0 | 4.7 | 14.0 | 5.0 | 16.0 |
| Cloud point (° C.) | −5.0 | −4.6 | −4.7 | −4.3 | −4.1 | −2.5 | −2.2 |
| FLT (° C.) | −9 | −10 | −9 | −9 | −7 | — | — |
| Engine cetane index | 56.2 | 56.7 | | 57.8 | 58.4 | 59.2 | 59.4 |
| Calculated cetane index | 57.8 | 59.5 | 59 | 61 | 60.6 | — | — |
| Normal paraffin (wt %) | | | | | | | |
| C14 | 2.32 | 2.20 | 2.26 | 2.16 | 2.11 | 1.97 | 2.04 |
| C15 | 2.68 | 3.13 | 3.23 | 3.99 | 4.21 | 5.94 | 6.43 |
| C16 | 2.51 | 3.61 | 3.54 | 4.37 | 4.17 | 5.31 | 4.76 |
| C17 | 2.34 | 2.80 | 2.91 | 3.86 | 4.13 | 6.29 | 6.63 |
| C18 | 1.98 | 3.08 | 2.97 | 3.88 | 3.67 | 5.15 | 4.5 |
| C19 | 1.56 | 1.48 | 1.48 | 1.40 | 1.42 | 1.38 | 1.32 |
| GPC (triglycerides) (wt %) | | <0.05 | <0.05 | <0.05 | <0.05 | <0.05 | <0.05 |
| Distillation temperature (° C., ASTM D86) | | | | | | | |
| 5% | 245.9 | 244.7 | 245.8 | 248.6 | 250.5 | | |
| (% of product distilled) | | | | | | | |
| 20% | 260.2 | 259.9 | 259.4 | 261.7 | 262.0 | | |
| 50% | 281.7 | 281.9 | 281.2 | 282.2 | 282.0 | | |

TABLE 5-continued characteristics of the effluents from Examples 1 to 4

| | Example | | | | |
|---|---|---|---|---|---|
| | 1 | 2 | | 3 | 4 |
| 80% | 310.9 | 310.2 | 309.1 | 308.1 | 308.8 |
| 95% | 346.4 | 342.9 | 343.0 | 340.9 | 342.5 |

Yield of Normal Paraffins

Table 2 indicates that palm oil is composed of 99 wt % of glycerides. The $C_{16}$ and $C_{18}$ chains represent 98% of the acids contained in the oil. Hydrogenation of these glycerides should preferably lead to the formation of paraffin chains of the same length $nC_{16}$ and $nC_{18}$.

Figure 3:
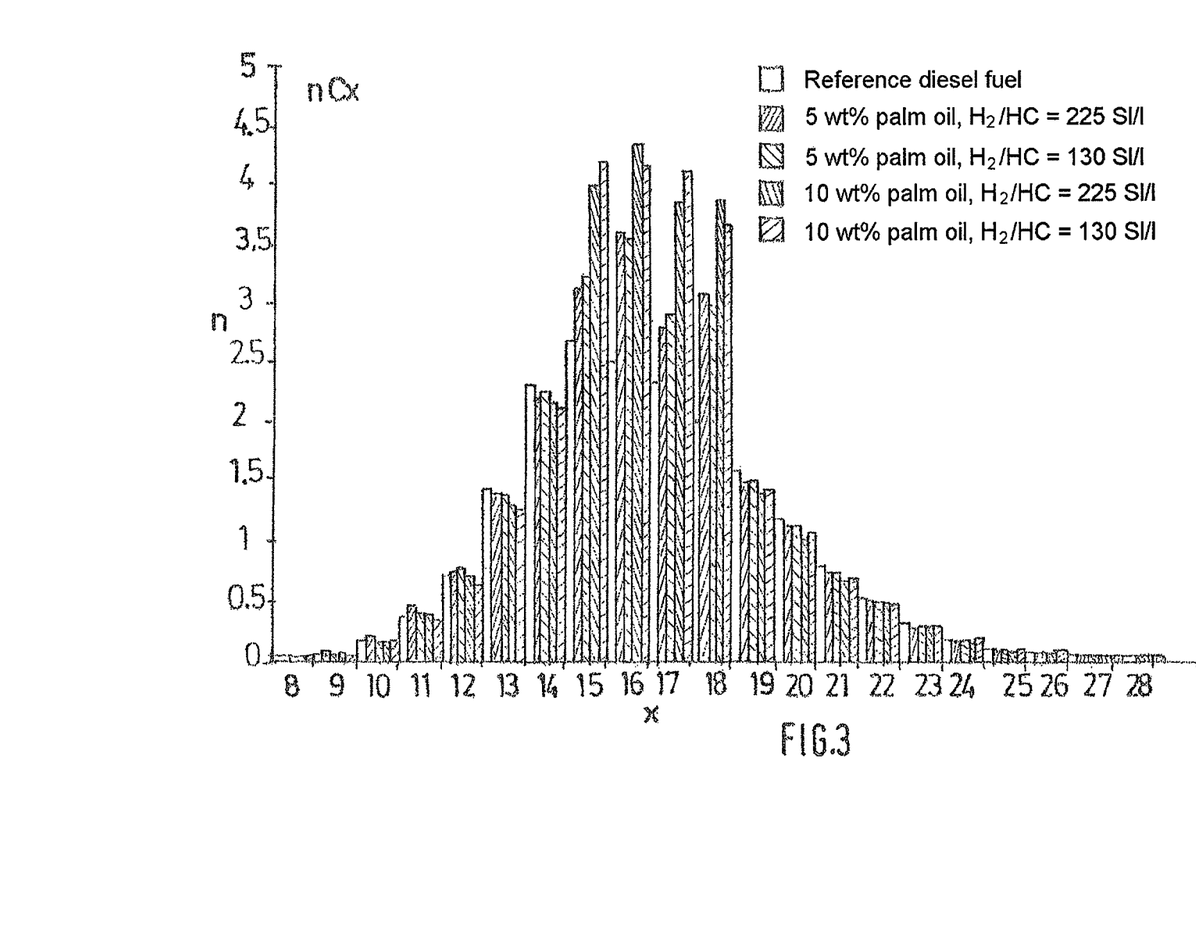
FIG. 3 represents the distribution of normal paraffins $nC_x$ in the effluents, the number x being plotted on the x-axis and the number n being plotted on the y-axis.

FIG. 3 represents the distribution of normal paraffins in the effluents from Examples 1 to 3. The addition of palm oil as a feed for hydrotreating results in a significant increase of the normal paraffins between $C_{15}$ and $C_{18}$. The formation of chains having odd lengths is due to the decarboxylation or decarbonylation (decarb) during hydrotreatment of the acid. This "parasite" reaction results in the emission of carbon monoxide (CO) and carbon dioxide ($CO_2$) instead of water ($H_2O$). In addition, methanation of the CO leads to the formation of $CH_4$.

As can be seen in FIG. 3, it is interesting to observe that the "decarb" increases on decreasing the hydrogen feed ratio and on increasing the oil incorporation level. An increase of 12 wt % of decarb is observed between 5 wt % and 10 wt % of palm oil.

As described previously, the decarboxylation/decarbonylation causes the emission of CO and $CO_2$ gases, decreasing the partial pressure of hydrogen. In addition, besides the safety problems for people, CO is a reversible inhibitor of the desulphurizing activity of the catalyst.

The levels of CO and $CO_2$ present in the gases in the case of 10 wt % incorporation of palm oil were measured (Example 3).

It was observed that when the hydrogen feed ratio was lower (130 Nl/l, which corresponds to 1.8 times the estimated hydrogen consumption), more decarb occurs in the paraffin chains thus producing more $C_1$ gases (sum of CO, $CO_2$ and $CH_4$). On the contrary, the CO concentration is lower in the case of a low hydrogen feed ratio to promote the production of $CO_2$.

These results are given in Table 6.

TABLE 6

CO and $CO_2$ content of the gases exiting the pilot unit

| | Example 1 | | Example 2 | | | |
|---|---|---|---|---|---|---|
| Feed | 225 Nl/l | | 225 Nl/l | | 130 Nl/l | |
| $H_2$/HC | mol % | wt % | mol % | wt % | mol % | wt % |
| CO | 0.00 | 0.00 | 0.64 | 4.03 | 0.86 | 3.85 |
| $CO_2$ | 0.00 | 0.00 | 0.88 | 8.70 | 2.37 | 16.57 |
| $CH_4$ | 0.06 | 0.53 | 0.34 | 1.22 | 0.69 | 1.77 |

A feed of 10% palm oil corresponds in terms of exothermicity to around 40% of a feed of LCO, or 20% of visbreaking diesel fuel+10% of LCO. This exothermicity may be controlled with no or few operating changes of a conventional unit.

20% of palm oil corresponds in terms of exothermicity to around 60% of LCO, or around 40% of visbreaking diesel fuel at the top of the reactor. The exothermicity is then controlled by playing on the number of catalyst beds, by using suitable quenches, etc.

Example 5

Determination by Calculating the Maximum Limit for Incorporation of Vegetable Oils Hydrodeoxygenation of triglycerides is a very exothermic reaction, which limits the incorporation of these triglycerides due to the extreme temperature difference acceptable within a reactor. The lower limit is determined by the temperature at which the reaction is initiated (288 C), the upper limit is determined by the limit of the metallurgy of the reactors (443° C.), namely a maximum temperature delta of 155° C. which will enable the calculation of a maximum incorporation limit.

Such a temperature difference corresponds to a maximum incorporation of 35.1 wt % of vegetable oil at the top of the reactor, determined by means of the calculation described hereinafter. This maximum value makes it possible to define an upper limit close to 30 wt %±5 when the addition of the biomass is carried out at the top of the reactor.

Calculation Hypotheses

The limiting hypotheses of the application are the following:

no liquid recycling is applied. The oil is only added at the top of the reactor by mixing with the hydrocarbon feed to be desulphurized;

it is considered that the hydrodeoxygenation (HDO) reaction is very fast and almost complete in the first bed of the reactor. Thus no quenching can cool the medium at this level of the reactor;

the reactor has a usage temperature limit due to its metallurgy. This value is common in the creation of this type of material and is equal to 850° F. (namely 453° C.). A safety margin of 10° C. is also held: the temperature limit reached in an industrial reactor is therefore 443° C.;

the HDO reaction is initiated at 288° C., which corresponds to the temperature at which the C—O bond is broken;

the reactor is considered to be adiabatic: no heat exchange with the outside;

any level of maximum temperature difference which would limit the application is not taken into account;

the hydrogen consumption of the diesel fuel used in this example is 0.5 wt %. This value corresponds to a "conventional" diesel fuel in a refinery. Another type of diesel fuel, such as an LCO, would consume more hydrogen and would therefore be more exothermic;

the amount of hydrogen introduced at the top of the reactor is equal to 3 times the amount consumed by the reactions in situ. This is considered to be 0.5 wt % of hydrogen for the diesel fuel part and 3 wt % for the vegetable oil part. The mass of hydrogen added at the top of the reactor is:

$$M_{hydrogen}=3\times[0.5\%\times M_{diesel\,fuel}+3\%\times M_{oil}].$$

Performing the Calculation

Input Data:

From the hypotheses made, the temperature increase range in the first bed or in the whole of the reactor (if this reactor does not have several beds) is between 288° C. (temperature limit to initiate the reaction) and 443° C. (usage temperature limit of a reactor), i.e., $\Delta T$ maxi=155° C.;

the energy released during the hydrodeoxygenation of the triglycerides is around $E_{oil}$=1000 kJ/kg of oil. This value takes into account the physical state in which the reaction products are present. In addition, the energy may vary depending on the type of oil used, palm oil is quite close to 950 kJ/kg whereas sunflower oil (having more unsaturation) is close to 1050 kJ/kg;

the energy released for treating the diesel fuel is lower and is often expressed as 14 kcal/mol of $H_2$ consumed. In this case, a diesel fuel consuming 0.5 wt % of $H_2$, corresponding to $E_{diesel\,fuel}$=150 kJ/kg, will be considered;

the "specific heat" of the diesel fuel is taken to be constant as a function of the temperature and equal to: $CP_{diesel\,fuel}$=2.3 kJ/kg/° C.;

the specific heat of a vegetable oil is very close to a hydrocarbon. In this example, this data is taken to be equal to that of the diesel fuel: $CP_{oil}$=2.3 kJ/kg/° C.; and the specific heat of hydrogen is:

$$CP_{H2}=14.3\ kJ/kg/°\ C.$$

Basic Equations.

The supply of heat to the reactor is the result of the hydrodeoxygenation reaction of the vegetable oil and of the desulphurization reaction of the diesel fuel:

$$Q_{supplied}=E_{oil}\times M_{oil}+E_{diesel\,fuel}\times M_{diesel\,fuel}$$

Cooling of the medium is carried out solely by the temperature rise of the oil, the diesel fuel and the hydrogen that are found in the reactor:

$$Q_{cooling}=[CP_{oil}\times M_{oil}+CP_{diesel\,fuel}\times M_{diesel\,fuel}+CP_{H2}\times M_{hydrogen}]\times\Delta T$$

The reactor being adiabatic, these two amounts of heat are equal:

$$E_{oil}\times M_{oil}+E_{diesel\,fuel}\times M_{diesel\,fuel}=\Delta T[CP_{oil}\times M_{oil}+CP_{diesel\,fuel}\times M_{diesel\,fuel}+CP_{H2}(3[0.5\%\times M_{diesel\,fuel}+3\%\times M_{oil}])]$$

By dividing this equation by $M_{oil}$, the term $\Psi=M_{diesel\,fuel}/M_{oil}$ is expressed by:

$$E_{oil}+E_{diesel\,fuel}\times\Psi=[CP_{oil}+CP_{diesel\,fuel}\times\Psi+CP_{H2}\times[1.5\%\times\Psi+9\%]]\times\Delta T$$

The final expression is the following:

$$\psi=\frac{E_{oil}/\Delta T-CP_{oil}-0.09CP_{H2}}{CP_{diesel\,fuel}+0.015CP_{H2}-E_{diesel\,fuel}/\Delta T}$$

Numerical Application

Following the numerical values defined previously, the ratio of diesel fuel to oil $\Psi$ is 1.85 for a temperature difference of 155° C. This corresponds to a maximum incorporation of 35.1 wt % of vegetable oil at the top of the reactor.

For a temperature difference of 155° C., a maximum incorporation limit can thus be defined as 30 wt %±5.

Examples 6 and 7 below show that beyond this maximum limit, the invention cannot be implemented without recycling.

Examples 6 and 7

Installation

The process according to the invention was tested on a pilot unit comprising an adiabatic reactor operating in ascending flow mode of the liquid and gas streams:

this reactor had a diameter of 38 mm;

a heater placed upstream of the reactor made it possible to heat the feed to be treated before it entered into the reactor;

the pilot unit had no gas recycling and the feed was treated in a single pass, that is to say in "once through" according to the experts;

the purity of the hydrogen injected into the pilot unit was 100%;

the inlet temperature of the reactor was set, the temperature gradient being the result of the exothermicity of the reaction;

a nitrogen-stripping stage was present at the reactor outlet in order to remove the $H_2S$, $NH_3$, CO, $CO_2$, and $H_2O$ gases, in case these compounds would be present in the effluent;

the reactor comprised a catalyst bed containing a catalyst formed from porous alumina on which cobalt and molybdenum oxides were deposited. This catalyst was in the form of trilobal extrudates; and the packing density was 0.719 kg/m³ of packed catalyst in the unit.

Feed Studied

A diesel fuel feed having 1.16% of sulphur was used in these examples, the palm oil being of food grade.

The characteristics of the diesel fuel feed are given in Table 7. The characteristics of the palm oil are identical to those given in Table 2 for Examples 1 to 4.

TABLE 7

| characteristics of the diesel fuel feed | |
|---|---|
| Density at 15° C. | 0.8685 |
| Sulphur content (ppm) | 11 600 |
| Sulphur SDBT (ppm) | 7 990 |
| Nitrogen content (ppm) | 213 |
| Distillation temperature of | |
| 5% | 244.9 |
| 20% | 274.9 |
| 50% | 307.8 |
| 80% | 339.7 |
| 95% | 364.8 |
| of the diesel fuel (° C., ASTM 86) | |
| Bromine index (mg Br/100 g) | 5 |
| Polyaromatics content (wt %) | 13.6 |
| Total aromatics content (wt %) | 29.8 |

Operating Conditions and Results

The hydrogen feed ratio (that is to say the amount of Normal liters of hydrogen per liter of feed) was set at 3 times the hydrogen consumption of the feed treated at the reactor inlet.

The hydrogen feed ratio used for the given Examples 6 and 7 is therefore different: at 30 wt % of palm oil, the feed ratio is 475 Nl/l, and 660 Nl/l at 50 wt % incorporation.

In these examples, the unit used comprised a single hydrotreating catalytic reactor, in which the volume of catalyst was 500 cm³. The pressure was 60 bar and the treatment inlet temperature was 300° C. (temperature making it possible to ensure the initiation of the hydrodeoxygenation reactions).

The sulphur content of the effluent was not a target of the test. The result of the test consisted in measuring the temperature at the reactor outlet and in deducing therefrom the average temperature of the reactor (WABT).

These results are given in Table 8 below.

TABLE 8 results of Examples 6 and 7

|  |  | Example 6 | Example 7 |
|---|---|---|---|
| Absolute pressure | bar | 60 | 60 |
| HSV | h⁻¹ | 1 | 1 |
| H₂ Feed ratio | Nl/l | 475 | 660 |
| Oil content | wt % | 30 | 50 |
| Inlet temperature | ° C. | 300 | 300 |
| Outlet temperature | ° C. | 443 | 488 |
| Delta T | ° C. | 143 | 188 |
| WABT | ° C. | 395 | 425 |
| Density |  | 0.8298 | 0.8152 |
| Effluent sulphur | ppm | 15 | 11 |

The implementation of the 30 wt % test (Example 6) led to a reactor outlet temperature of 443° C., which is close to the limit of the metallurgy normally used in the manufacture of the reactors (limit set at 850° F., namely 453° C.).

The incorporation of a feed containing 50 wt % vegetable oil in a conventional diesel fuel feed (Example 7) could not be applied in an industrial unit without recycling as the outlet temperature was greater than the normal metallurgical limit used in industrial reactors.

The invention claimed is:

1. An industrial process for the catalytic hydrotreating of a feed of oil origin, of diesel fuel type, in at least one fixed-bed hydrotreating reactor, for manufacturing diesel fuel, comprising incorporating into said feed vegetable oils and/or animal fats up to a level of around 30% by weight, the mixture of said feed and vegetable oils and/or animal fats being introduced into the reactor operating in a single pass, without recycling liquid effluent at the top of the reactor, passing said feed through at least a first catalyst bed in the reactor containing at least one catalyst based on NiMo oxides and/or NiW oxides and at least a second catalyst bed containing catalysts based on CoMo, in this order, and recovering all liquid effluents, said liquid effluents being the diesel fuel.

2. Catalytic hydrotreating process according to claim 1, characterized in that the level of vegetable oils and/or animal fats is from 2.5 to 25% by weight.

3. Catalytic hydrotreating process according to claim 1, in which the feed of oil origin, of diesel fuel type, is chosen from the diesel fuel cuts resulting from the direct distillation of a crude oil, the diesel fuel cuts derived from catalytic cracking and/or visbreaking.

4. Catalytic hydrotreating process according to claim 1, in which the vegetable oils are chosen from palm oil, soya bean oil, rapeseed oil, sunflower oil, or a mixture of two or more of these oils.

5. Catalytic hydrotreating process according to claim 1, in which the amount of hydrogen introduced into the reactor to treat the feed is from 100 to 500 Normal liters of $H_2$ per liter of feed.

6. Catalytic hydrotreating process according to claim 1, in which the feed is treated at a temperature of 320 to 420° C.

7. Catalytic hydrotreating process according to claim 1, in which the feed is treated at a pressure of 25 to 150 bar.

8. Catalytic hydrotreating process according to claim 1, comprising treatment of recycling gas derived from the hydrotreating of the feed before its reinjection into the reactor, in which an additional treatment is carried out during which the carbon monoxide present in said recycling gas is treated and is separated from said recycling gas before its reinjection into the reactor.

9. Catalytic hydrotreating process according to claim 8, in which, in addition, a treatment is carried out during which the carbon dioxide present in said recycling gas is treated and is separated from said recycling gas before its reinjection into the reactor.

10. Catalytic hydrotreating process according to claim 1, in which the exothermicity of the hydrotreating of the feed is controlled by means of thermal control systems.

11. Hydrorefining unit for implementing the process according to claim 8, comprising at least one reactor for the catalytic hydrotreating of a feed of oil origin, of diesel fuel type, and a separator that separates the liquid and vapour phases of the effluent exiting the reactor, characterized in that it comprises, downstream of the separator, a unit for treating and separating carbon monoxide present in the vapour phase of the effluent for implementing the process according to claim 8, wherein the reactor comprises at least a first catalyst bed containing at least one catalyst based on NiMo oxides and/or NiW oxides and at least a second catalyst bed containing catalysts based on CoMo, in this order.

12. Hydrorefining unit for implementing the process according to claim 9, comprising at least one reactor for the catalytic hydrotreating of a feed of oil origin, of diesel fuel type, and a separator that separates the liquid and vapour phases of the effluent exiting the reactor, characterized in that it comprises, downstream of the separator, a unit for treating and separating carbon monoxide present in the vapour phase of the effluent and a unit for treating and separating carbon dioxide present in the vapour phase of the effluent for implementing the process according to claim 9, wherein the reactor comprises at least a first catalyst bed containing at least one catalyst based on NiMo oxides and/or NiW oxides and at least a second catalyst bed containing catalysts based on CoMo, in this order.

13. Catalytic hydrotreating process according to claim 4, in which the vegetable oil is palm oil.

14. Catalytic hydrotreating process according to claim 5, in which the amount of hydrogen introduced into the reactor to treat the feed is from 120 to 450 Normal liters of $H_2$ per liter of feed.

15. Catalytic hydrotreating process according to claim 6, in which the feed is treated at a temperature of 340 to 400° C.

16. Catalytic hydrotreating process according to claim 7, in which the feed is treated at a pressure of 30 to 70 bar.

* * * * *